Patented Oct. 23, 1928.

1,688,503

UNITED STATES PATENT OFFICE.

CLAUDE G. MINER, OF BERKELEY, CALIFORNIA.

METHOD OF PRODUCING PHOSPHORUS CHLORIDE.

No Drawing.   Application filed July 25, 1925. Serial No. 46,113.

This invention relates to improvements in certain methods of producing phosphorus chloride.

Heretofore it has been common practice to produce phosphorus chlorides by reacting phosphate rock with sodium chloride. The reaction by which phosphorus chloride has been produced is as follows:

$$Ca_3(PO_4)_2 + 10NaCl = 3CaO + 5Na_2O + 2PCl_5.$$

I have discovered that phosphorus sulphide may be produced by reacting phosphate rock and sodium sulphide according to the following corresponding reaction:

$$Ca_3(PO_4)_2 + 5Na_2S = 3CaO + 5Na_2O + P_2S_5.$$

In these former operations a high thermal energy consumption has been necessitated because of the difficulty with which the phosphorus pentoxide is freed from the phosphate rock by the sodium chloride or sodium sulphide. It has also been found that a solid residue of calcium oxide and sodium oxide is produced in the above reactions and that this residue accumulates to an extent which makes it necessary to frequently shut down the operation and precludes a continuous operation of the process. It has also been found that in the above operations that some of the sodium oxide formed becomes volatilized and passes over with the phosphorus chloride or sulphide vapors, thus necessitating a subsequent separation to purify the phosphorus chloride or sulphide to remove such sodium oxide.

I have discovered that if silica be employed in substantial quantity in the aforesaid operations that the difficulties above mentioned may be eliminated or substantially lessened. The employment of the silica in the reaction serves to produce a fusible slag, eliminating the solid residue in the reaction chamber and permitting the operation to proceed continuously. The presence of the silica assists in freeing the phosphorus pentoxide ($P_2O_5$) from the phosphate rock by forming an intermediate compound at a reduced temperature in which compound phosphorus pentoxide is loosely held and from which it is readily liberated by additional heat. The reaction illustrating the formation of this intermediate compound is:

$$Ca_3(PO_4)_2 + 3SiO_2 \rightarrow 3CaO \cdot 3SiO_2 \cdot P_2O_5.$$

The reaction illustrating the liberation of the phosphate pentoxide from the intermediate compound is:

$$3CaO3SiO_2 \cdot P_2O_5 \rightarrow 3CaO + 3SiO_2 + P_2O_5.$$

The pressence of the silica in the operation further serves to prevent a portion of the sodium oxide becoming volatilized and passing over with the phosphorus chloride or sulphide inasmuch as the silica reacts with the calcium and sodium oxides to form calcium sodium silicate slag. This reaction is:

$$Ca_3(PO_4)_2 + 8SiO_2 + 10Nacl \rightarrow 2PCl_5 + 3CaSiO_3 \cdot 5Na_2SiO_3.$$

It will be apparent that the presence of the silica in the operation, acting in the various capacities above described, materially reduces the thermal energy required in the operation.

In accordance with the invention, and as an illustrative example, 300 parts by weight of tri-calcium phosphate and 625 parts by weight of sodium chloride may be caused to react in the presence of 500 parts by weight of silicon dioxide. Heat is applied to an extent sufficient to carry on the reaction at a temperature of approximately 1100 to 1400° C. Phosphorus pentachloride as a gas passes as one product from the reaction chamber and the remaining products, including silicates of sodium and calcium, are in the form of a fusible slag which may be run off from the reaction chamber.

While in the specific example given in this specification sodium chloride or sulphide alone have been designated it is to be understood that any of the alkali-metal or alkali-earth metal chlorides or sulphides may be employed in the production of the phosphorus chloride or sulphide.

The invention is capable of being put to use under widely varying circumstances and conditions, and I do not intend to limit the same to the above disclosure except as may be required by the following claims.

I claim:

1. A process of producing volatile phosphorus compounds from phosphate rock which comprises causing phosphate rock to react with a halogen salt of an alkali-metal in the presence of silica.

2. A process of producing phosphorus chloride from phosphate rock which comprises causing phosphate rock to react with an alkali-metal chloride in the presence of silica.

3. A process of producing phosphorus chloride from phosphate rock which comprises causing phosphate rock to react with an alkali-metal chloride in the presence of silica at a temperature of substantially 1100° to 1400° C.

4. A process of producing phosphorus chloride from phosphate rock in accordance with the following reaction:

$$Ca_3(PO_4) + 8SiO_2 + 10NaCl \rightarrow 2PCl_5 + 3CaSiO_3 \cdot 5Na_2SiO_3.$$

5. In a process of producing phosphorus chloride from phosphate rock by causing phosphate rock to react with a chloride of an alkali forming metal, the step of employing silica in the reaction to form a non-volatile silicate to produce substantially pure volatile phosphorus chloride.

Signed at San Francisco, Calif., this 10th day of July, 1925.

CLAUDE G. MINER.